(12) United States Patent
Campbell

(10) Patent No.: US 8,196,996 B1
(45) Date of Patent: Jun. 12, 2012

(54) VEHICLE DRAG REDUCER

(76) Inventor: Robert Campbell, Gold Canyon, AZ (US)

( * ) Notice: Subject to any disclaimer, the term of this patent is extended or adjusted under 35 U.S.C. 154(b) by 0 days.

(21) Appl. No.: 12/938,989

(22) Filed: Nov. 3, 2010

Related U.S. Application Data

(63) Continuation-in-part of application No. 12/069,843, filed on Feb. 11, 2008, now abandoned.

(51) Int. Cl.
*B62D 35/00* (2006.01)

(52) U.S. Cl. .................. 296/180.4; 296/180.1

(58) Field of Classification Search ........... 296/180.1, 296/180.4, 208, 91
See application file for complete search history.

(56) References Cited

U.S. PATENT DOCUMENTS

| | | |
|---|---|---|
| 2,514,695 A | 7/1950 | Dempsey |
| 3,455,594 A | 7/1969 | Hall et al. |
| 3,791,468 A | 2/1974 | Bryan, Jr. |
| 3,910,623 A | 10/1975 | McKeen |
| 3,960,402 A | 6/1976 | Keck |
| 3,999,797 A | 12/1976 | Kirsch et al. |
| 4,047,747 A | 9/1977 | Beers |
| 4,142,755 A | 3/1979 | Keedy |
| 4,210,354 A | 7/1980 | Canning |
| 4,257,641 A | 3/1981 | Keedy |
| 4,291,911 A | 9/1981 | Gallmeyer |
| 4,311,334 A | 1/1982 | Jenkins |
| 4,316,630 A | 2/1982 | Evans |
| 4,320,919 A | 3/1982 | Butler |
| 4,320,920 A | 3/1982 | Goudey |
| 4,357,045 A | 11/1982 | Kinford, Jr. |
| 4,379,582 A | 4/1983 | Miwa |
| 4,379,583 A | 4/1983 | Taylor et al. |
| 4,460,055 A | 7/1984 | Steiner |
| 4,508,380 A | 4/1985 | Sankrithi |
| 4,611,847 A | 9/1986 | Sullivan |
| 4,810,022 A | 3/1989 | Takagi et al. |
| 4,867,397 A | 9/1989 | Pamadi et al. |
| 4,978,162 A | 12/1990 | Labbe |
| 5,058,945 A | 10/1991 | Elliott, Sr. et al. |
| 5,108,145 A | 4/1992 | Harris |
| 5,171,057 A | 12/1992 | Sharp |
| 5,280,990 A | 1/1994 | Rinard |
| 5,348,366 A | 9/1994 | Baker et al. |
| 5,375,903 A | 12/1994 | Lechner |
| 5,947,548 A | 9/1999 | Carper et al. |
| 6,045,095 A | 4/2000 | Parrish, IV |

(Continued)

FOREIGN PATENT DOCUMENTS

WO  WO9219485  11/1992

*Primary Examiner* — Glenn Dayoan
*Assistant Examiner* — Melissa A Black
(74) *Attorney, Agent, or Firm* — Adam R. Stephenson, Ltd.

(57) ABSTRACT

A vehicle drag reducer. Implementations may include an upper portion attached or integrated within a top of a vehicle and having four air ducts configured to receive air from a front end of the top of the vehicle and transmit it towards a rear end of the top of the vehicle; and two back portions located at a back of the vehicle each including two air ducts and six exit ports, each back portion being configured to receive air from two of the four air ducts of the upper portion and exit the air from the back portion through the six exit ports. The upper portion may include one of a U joint, a Z joint, and an L joint connecting the upper portion to the vehicle. The back portion may include one of a U joint and a Z joint. Methods of reducing vehicle drag are disclosed.

17 Claims, 7 Drawing Sheets

U.S. PATENT DOCUMENTS

| | | |
|---|---|---|
| 6,286,894 B1 | 9/2001 | Kingham |
| 6,634,700 B1 | 10/2003 | Calvert |
| 6,666,498 B1 | 12/2003 | Whitten |
| 6,685,256 B1 | 2/2004 | Shermer |
| 6,692,066 B2 | 2/2004 | Fairburn et al. |
| 6,702,364 B2 | 3/2004 | Neel |
| 6,736,447 B2 | 5/2004 | Angelo et al. |
| 6,779,834 B1 | 8/2004 | Keller |
| 7,192,077 B1 | 3/2007 | Hilleman |
| 7,318,619 B2 | 1/2008 | Munro |
| 7,364,220 B2 | 4/2008 | Shahbazi |
| 2003/0205913 A1 | 11/2003 | Leonard |
| 2004/0069195 A1 | 4/2004 | Goldstein |
| 2005/0040637 A1 | 2/2005 | Wood |
| 2005/0040668 A1 | 2/2005 | Wood |
| 2005/0040669 A1 | 2/2005 | Wood |
| 2007/0001491 A1 | 1/2007 | Marotta |
| 2007/0013209 A1 | 1/2007 | Neuberger et al. |
| 2007/0089531 A1 | 4/2007 | Wood |
| 2007/0126261 A1 | 6/2007 | Breidenbach |
| 2007/0132276 A1 | 6/2007 | Wood |
| 2007/0176465 A1 | 8/2007 | Wood |
| 2008/0011523 A1 | 1/2008 | Packard |

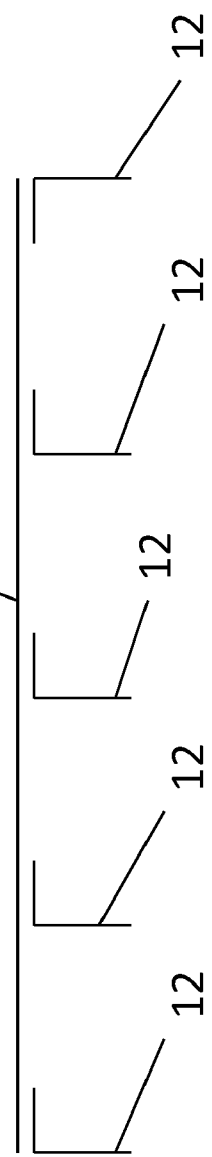
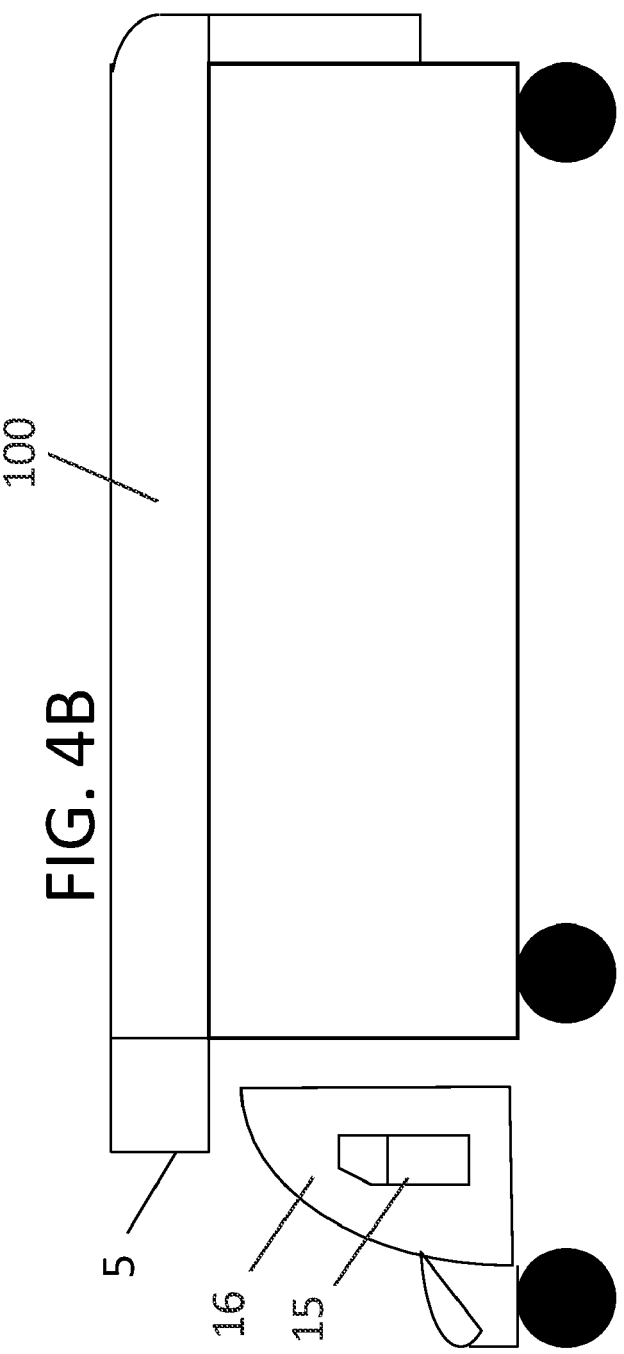
FIG. 4A
FIG. 4B

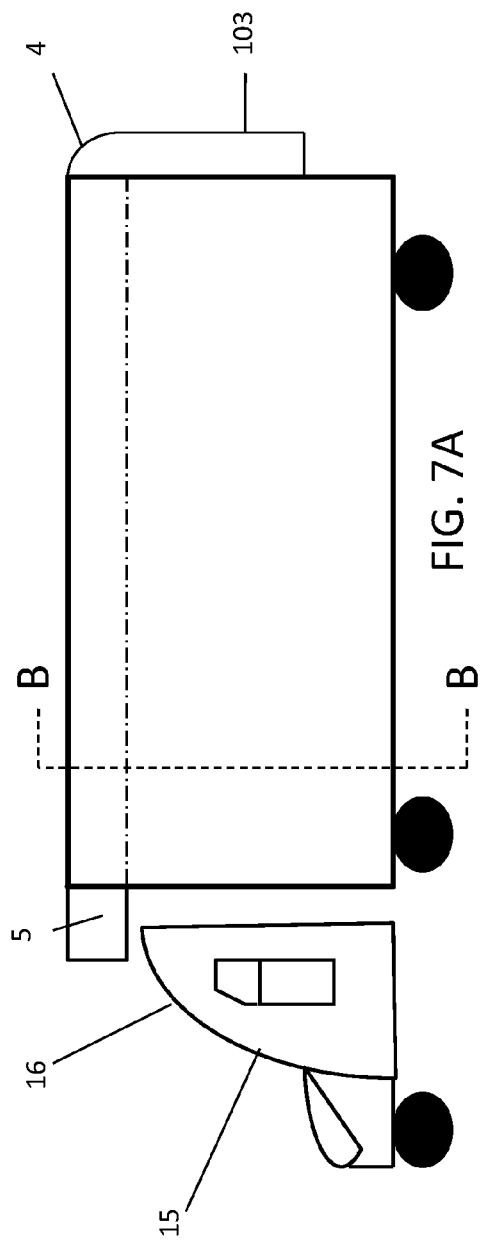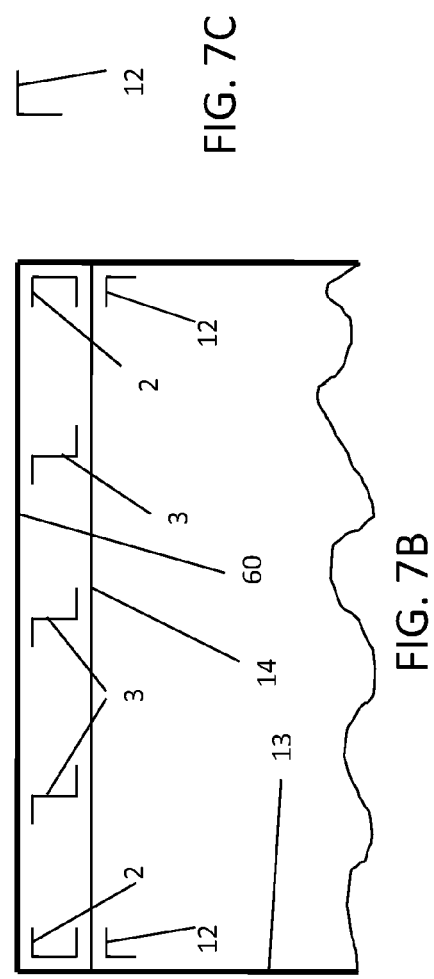

VEHICLE DRAG REDUCER

CROSS REFERENCE TO RELATED APPLICATIONS

This application is a continuation-in-part application of the earlier U.S. Utility Patent Application to Robert Campbell entitled "System for the Reduction of Aerodynamic Drag On Vehicles," application Ser. No. 12/069,843, filed Feb. 11, 2008, now pending, the disclosure of which is hereby incorporated entirely herein by reference.

BACKGROUND

1. Technical Field

Aspects of this document relate generally to drag reducers for land vehicles. More specific implementations involve drag reducers for trucks, semi-trailers, box-type trucks (such as common moving trucks), full truck vans, and similar vehicles, and trailers hauled by the same.

2. Background Art

Land vehicles such as automobiles, trucks, semi-trailers, box-type trucks, full truck vans, and similar vehicles, and trailers hauled by the same, experience drag—a retarding force acting on them parallel and opposite to the direction of motion of the vehicle caused by air resistance. Many conventional devices and systems have been devised to reduce the air resistance and the drag on a vehicle or trailer.

SUMMARY

Implementations of vehicle drag reducers may include: an upper portion that is one of attached to and integrated within a top of a vehicle, the upper portion including four air ducts configured to receive air from a front end of the top of the vehicle and transmit the air towards a rear end of the top of the vehicle; and two back portions located at a back of the vehicle each including two air ducts and six exit ports, each back portion being configured to receive air from two of the four air ducts of the upper portion and exit the air from the back portion through the six exit ports.

Implementations of vehicle drag reducers may include one, all, or any of the following:

The upper portion may include one of a U joint, a Z joint, and an L joint connecting the upper portion with the vehicle.

The back portion may include one of a U joint and a Z joint connecting a first plate of the back portion to one of a second plate of the back portion and a rear door of the vehicle.

The upper portion may include an extension extending forward towards a front of the vehicle over a portion of one of a cab and an air dam of the vehicle across an entire width of the vehicle.

The vehicle drag reducer may include a rounded portion at a juncture of the upper portion and the back portion, configured to direct the air from the upper portion towards the back portion.

The upper portion may include three Z joints and two U joints connecting the upper portion with the vehicle, and the back portion may include four U joints and two Z joints connecting a first plate of the back portion to one of a second plate of the back portion and a rear door of the vehicle.

Implementations of vehicle drag reducers may include: an upper portion that is one of attached to and integrated within a top of a vehicle, the upper portion including one of a U joint, a Z joint, and an L joint connecting the upper portion to the vehicle; the upper portion being configured to receive air from a front of the top of the vehicle and transmit the air towards a rear end of the top of the vehicle; and a back portion located at a back of the vehicle including an exit port and including one of a U joint and a Z joint, the back portion being configured to receive air from the upper portion and exit the air from the back portion through the exit port.

Implementations of vehicle drag reducers may include one, all, or any of the following:

The upper portion may include four air ducts configured to receive air from a front end of the top of the vehicle and transmit the air towards a rear end of the top of the vehicle.

The back portion may include two air ducts.

The back portion may include six exit ports.

The vehicle drag reducer may include two back portions and each back portion may include two air ducts and each may be configured to receive air from two of four air ducts of the upper portion and exit the air from the back portion through six exit ports of the back portion.

The upper portion may include an extension extending forward towards a front of the vehicle over a portion of one of a cab and an air dam of the vehicle across an entire width of the vehicle.

The vehicle drag reducer may further include a rounded portion at a juncture of the upper portion and the back portion, configured to direct the air from the upper portion towards the back portion.

The upper portion may include three Z joints and two U joints connecting the upper portion to the vehicle, and the back portion may include four U joints and two Z joints connecting a first plate of the back portion to one of a second plate of the back portion and a rear door of the vehicle.

Implementations of methods of reducing vehicle drag may include: one of attaching an upper portion of a vehicle drag reducer to a top of a vehicle and integrating an upper portion of a vehicle drag reducer within a top of a vehicle; the upper portion including four air ducts configured to receive air from a front end of the top of the vehicle and transmit the air towards a rear end of the top of the vehicle; and locating two back portions of the vehicle drag reducer at a back of the vehicle, the back portions each including two air ducts and six exit ports, each back portion being configured to receive air from two of the four air ducts of the upper portion and exit the air from the back portion through the six exit ports.

Implementations of methods of reducing vehicle drag may include one, all, or any of the following:

Connecting the upper portion to the vehicle with one of an L joint, a Z joint, and a U joint.

Connecting a first plate of the back portion to one of a second plate of the back portion and a rear door of the vehicle with one of an L joint, a Z joint, and a U joint.

Extending an extension of the upper portion forward towards a front of the vehicle over a portion of one of a cab and an air dam of the vehicle across an entire width of the vehicle.

Directing the air from the upper portion towards the back portion through a rounded portion at a juncture of the upper portion and the back portion.

Connecting the upper portion to the vehicle with three Z joints and two U joints and connecting a first plate of the back portion to one of a second plate of the back portion and a rear door of the vehicle with four U joints and two Z joints.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIG. 4A is a front view of an extension of a vehicle drag reducer;

FIG. 4B is a side view of a vehicle with a vehicle drag reducer in place;

FIG. 7A is a side view of a vehicle with a vehicle drag reducer integrated within the top of the vehicle—with the dashed line indicating where a bottom plate of the upper portion resides behind the vehicle's wall;

FIG. 7B is a front cross section view of the vehicle and vehicle drag reducer of FIG. 7A taken along line B-B; and FIG. 7C is a front view of an L joint.

DESCRIPTION

This disclosure, its aspects and implementations, are not limited to the specific components or assembly procedures disclosed herein. Many additional components and assembly procedures known in the art consistent with the intended vehicle drag reducers and/or assembly procedures for vehicle drag reducers will become apparent for use with particular implementations from this disclosure. Accordingly, for example, although particular implementations are disclosed, such implementations and implementing components may comprise any shape, size, style, type, model, version, measurement, concentration, material, quantity, and/or the like as is known in the art for such vehicle drag reducers and implementing components, consistent with the intended operation.

Figure 1:
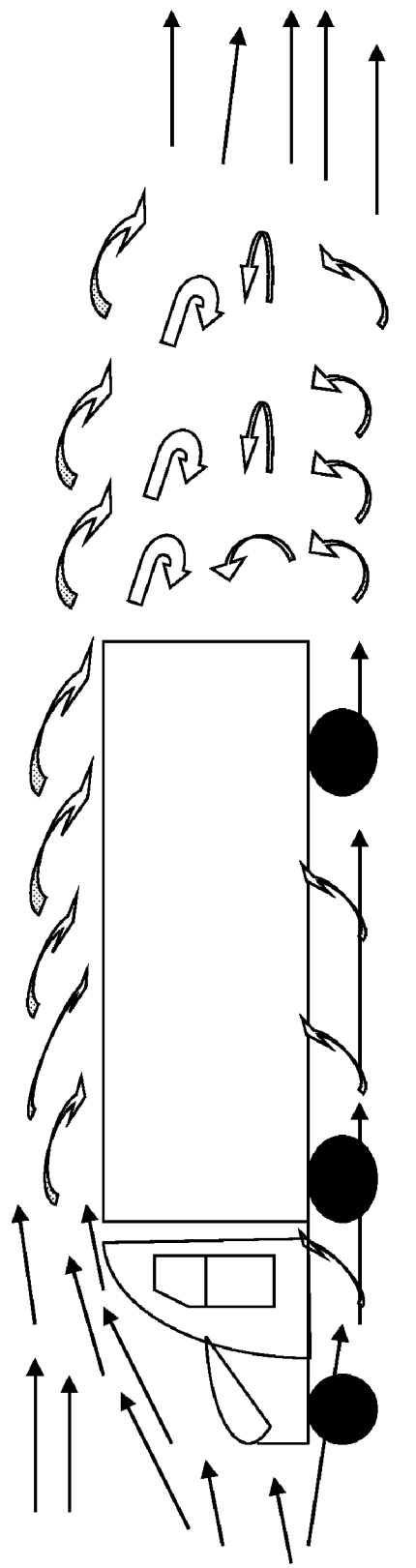
FIG. 1 is a side view of a vehicle in motion, with the arrows depicting the motion of air around the vehicle.

Referring now to FIG. 1, a vehicle in motion is subject to drag caused by displacement of the air at the front of the vehicle. Arrows in FIG. 1 depict the movement of air around a vehicle illustrating the various air flows. For ease of description, wherever the word "vehicle" is used throughout this disclosure, it may refer to either or both the driving and trailing portions. For instance, with a semi-trailer, the driving portion (truck) is considered a vehicle and the trailer is also considered a vehicle.

Figure 2:
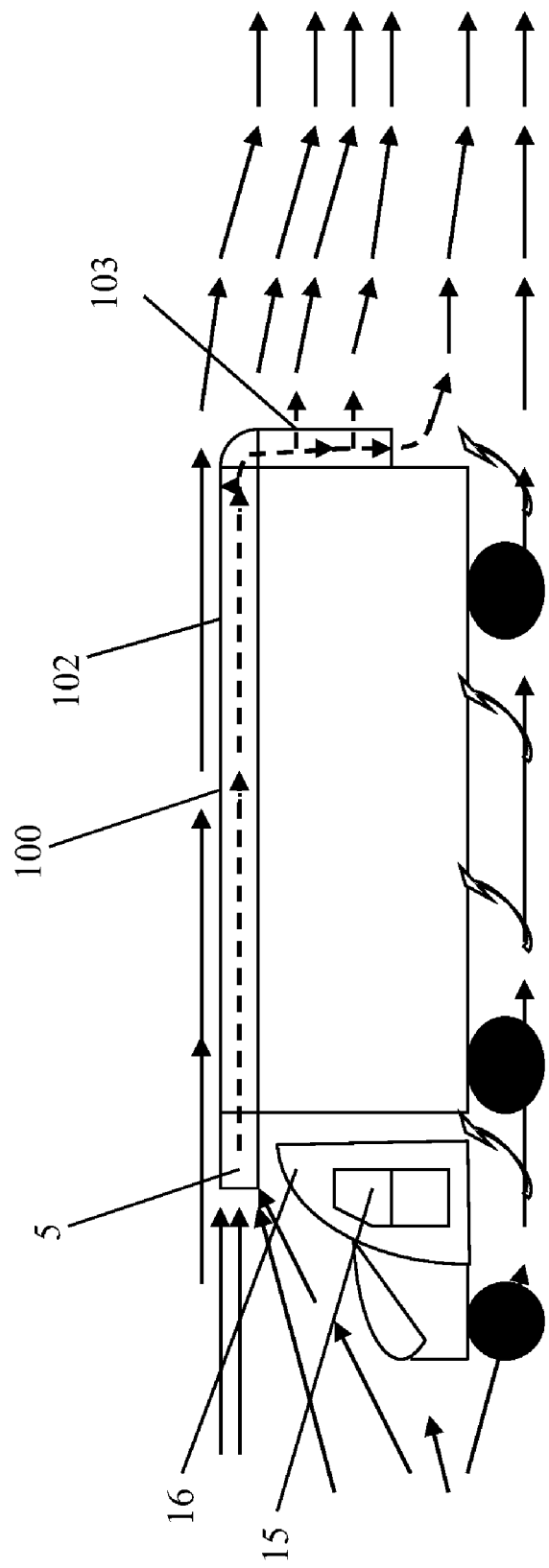
FIG. 2 is a side view of the vehicle of FIG. 1 with a vehicle drag reducer; with arrows showing the movement of air around the vehicle and the dashed arrows showing the movement of air within the vehicle drag reducer.

Referring now to FIG. 2, an implementation of a vehicle drag reducer 100 is illustrated. The vehicle drag reducer 100 includes an upper portion 102 located at a top of the vehicle and a back portion 103 located at a back of the vehicle. The vehicle drag reducer 100 in this illustration also includes an extension 5 extending forward over a portion of the air dam 16 and cab 15 of the vehicle. The extension 5 may channel air from outside the vehicle into the upper portion 102 as the vehicle drives. The extension 5 may also be configured to make a clean cut through the air stream, minimizing the air flow disturbance. Arrows in this figure depict the movement of air around the vehicle, and the dashed arrows indicate the movement of air inside the vehicle drag reducer 100. The extension 5 may be manufactured as an integral part of the upper portion 102 or it may be fabricated separately and attached to the upper portion 102.

Figure 3A:
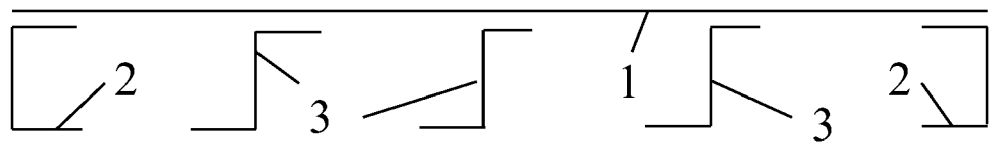
FIG. 3A is a front view of an upper portion a vehicle drag reducer.
Figure 3B:
FIG. 3B is a front view of a U joint and a Z joint of the upper portion of FIG. 3A.
Figure 3C:
FIG. 3C is a back view of the upper portion of FIG. 3A.

Referring now to FIG. 3A, the upper portion 102 of the drag reducer may include a top plate 1 and several structural members. In this implementation the structural members include U joints 2 and Z joints 3. FIG. 3B shows a front view of both a U joint 2 and a Z joint 3. The U joints 2 and Z joints 3 give structure and support to the upper portion 102 and are used to attach the upper portion 102 to the vehicle. FIG. 3C is a back view of the upper portion 102, indicating that the back end of the upper portion 102 is not open but is closed off with a back plate 20. In the area of the extension 5, the U joints 2 and Z joints 3 may have the bottom portions removed, such as a bottom flange, to reduce air flow turbulence (essentially transforming them all into L joints 12 over the length of the removed bottom portion). A front view of such an extension implementation is illustrated in FIG. 4A. Any of the U joints 2, Z joints 3, and L joints 12 of this disclosure may be joists.

Referring back to FIG. 3A, in this implementation of an upper portion 102 there are two U joints 2 on opposite ends of the width of the upper portion 102 and three Z joints 3 between the two U joints 2, all of the joints being spaced evenly apart. In other implementations, there could be any number of U joints 2 and Z joints 3 in any configuration and relationship to each other.

Figure 3D:
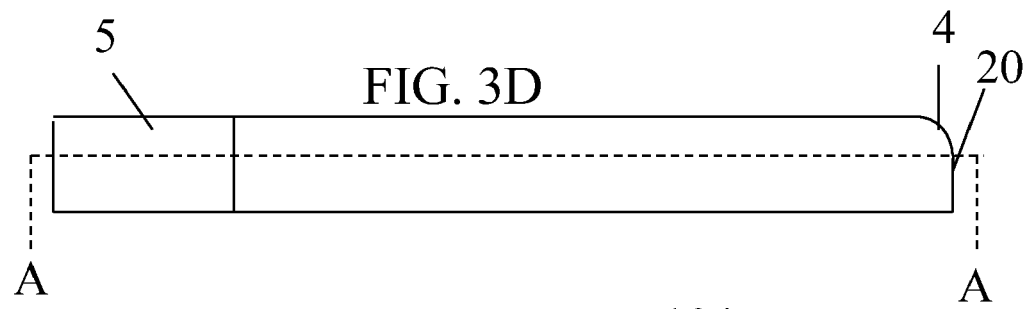
FIG. 3D is a side view of the upper portion of FIG. 3A.

FIG. 3D again illustrates a side view of an implementation of an extension 5 extending forward over a portion of the air dam 16 or cab 15 of the vehicle. Also shown in FIG. 3D is a rounded portion 4 located at a rear end of the upper portion 102 (in this case, coinciding with the back plate 20) which is at a juncture of the upper portion 102 with a back portion 103 (not shown in FIG. 3D). The rounded portion 4 directs the air flowing through the upper portion 102 towards the back portion 103.

Figure 3E:
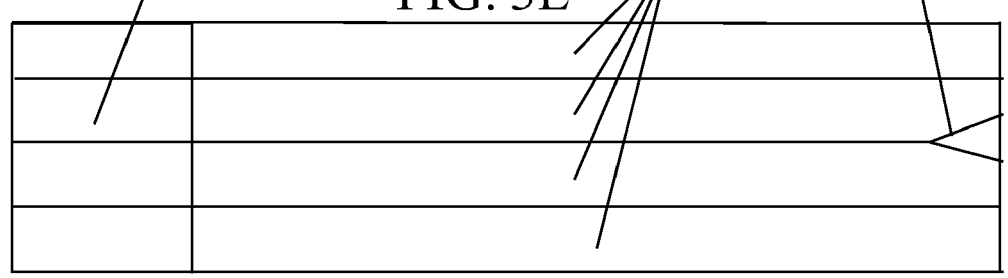
FIG. 3E is a top cross sectional view of the upper portion of FIG. 3D taken along line A-A (this top cross sectional view is also the equivalent of the top view of the upper portion of FIG. 3A with the top plate removed)

Referring now to FIG. 3E (which is a top cross-section view of the upper portion 102 of FIG. 3D taken along sectional line A-A; and which equivalently is a top view of the upper portion 102 of FIG. 3A with the top plate 1 removed) the U joints 2 and Z joints 3 divide the upper portion 102 into four air ducts 104. When a vehicle is in motion, the air enters into a front end of the upper portion 102 (FIG. 3A) and travels along towards a back of the upper portion 102, towards the back plate 20 and, in this case, towards the rounded portion 4. Also shown is a splitter 17. The splitter 17 is a split in the central support member, in this case the central Z joint 3, which splits the two central air ducts 104. In other implementations the other support members could be split or bent so that one, all, or any number of the air ducts 104 are split from one another and/or experience a reduction in cross sectional area towards the back of the upper portion 102. Also, depending upon the configuration of the various U joints and Z joints, the air ducts 104 may not all be the same size.

Referring now to FIG. 4B, a vehicle is shown with a vehicle drag reducer 100 in place. In this implementation, the vehicle drag reducer 100 is installed along the top and the back sides of the vehicle trailer. The extension 5 can be seen extending forward above the cab 15 and air dam 16 of the vehicle.

Figure 5A:
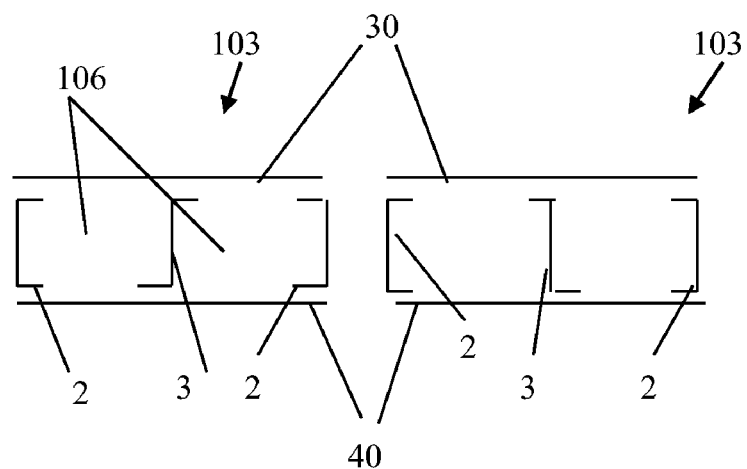
FIG. 5A is a front view of two back portions of a vehicle drag reducer.

Referring now to FIG. 5A, two identical back portions 103 of a vehicle drag reducer 100 are shown. FIG. 5A is a top view of the two back portions 103 and indicates that they are open on top. The open portion of the top of each back portion 103 aligns and/or couples with an open portion on the rear end of the upper portion 102 (not shown) in order to create a continuous passage for air to travel through the vehicle drag reducer 100 from the upper portion 102 to the back portion 103. In some implementations the rounded portion 4 is an integral part of the upper portion 102, in which case the upper portion 102 would resemble FIG. 3D. In other implementations the rounded portion 4 could be an integral part of the back portion 103 and the back end of the upper portion 102 would be left open for the rounded portion 4 to align with and/or couple with the upper portion 102 in order to create a continuous passage for air to travel through the vehicle drag reducer 100 from the upper portion 102 to the back portion 103. In yet other implementations the rounded portion 4, the upper portion 102, and the back portion 103 may be three individual parts with the rear end of the upper portion 102 being open, and the top portion of the back portion 103 being open, and the rounded portion 4 being configured to align and/or couple with both the opening in the rear of the upper portion 102 and the opening in the top of the back portion 103 to create a continuous passage for air to travel through the vehicle drag reducer 100.

Referring back to FIG. 5A, the back portions 103 in this implementation each include a first plate 30 and a second plate 40. In other implementations, the second plate 40 is omitted and U joints 2 and Z joints 3 may be directly attached to the back door of the vehicle. In some implementations the second plate 40 is included and the back portion 103 may be attached to the vehicle using hinges attached to the back door of the vehicle and one of a second plate 40, a U joint 2, an L joint 12, a Z joint 3, and a first plate 30. The U joints 2 and Z joints 3 of this implementation form two air ducts 106 in each back portion 103.

Figure 5B:
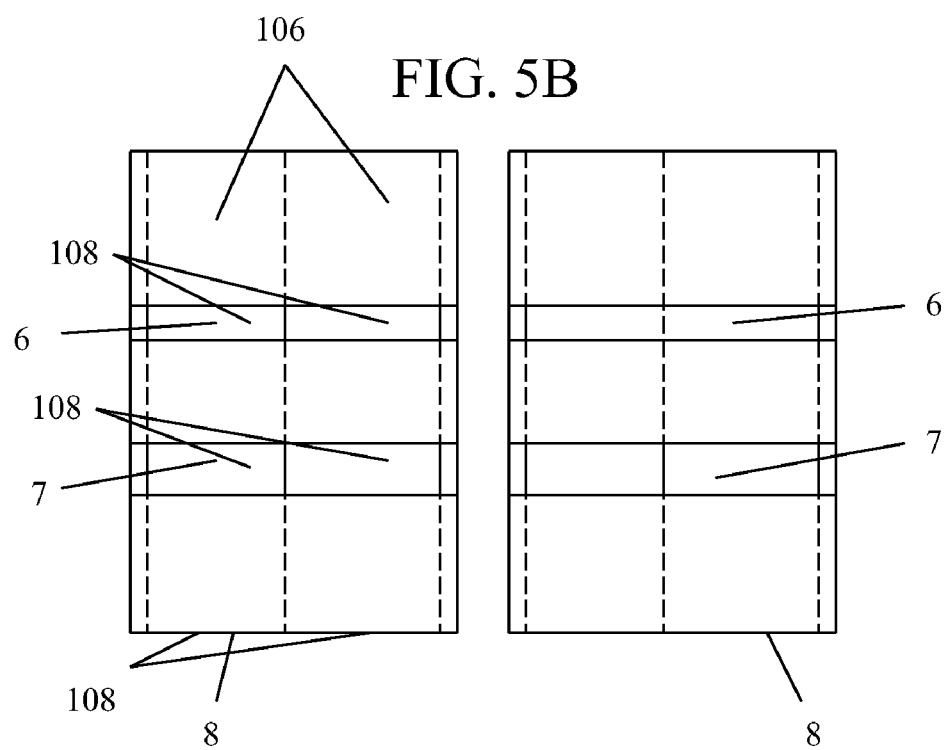
FIG. 5B is a top view of the two back portions of FIG. 5A, with dashed lines indicating where the U joints and Z joints exist behind the first plate of the back portion.

Referring now to FIG. 5B, each back portion 103 of this implementation includes six exit ports 108 whereby air exits the back portion 103. In this implementation there are four exit ports 108 (exit ports 6 and 7) in the first plate 30 and two exit ports 108 (exit ports 8) at a bottom of the back portion 103. In other implementations the back portion 103 could comprise any number of exit ports 108 located anywhere on the back portion 103. In this implementation the various exit ports 108 have different sizes. For instance the exit ports 6 are located about ⅓ down from the top of the first plate 30, and the exit ports 6 are about 3 inches in height. The exit ports 7 are located further down the back portion 103 and are about 6 inches in height. The exit ports 8 are located at the bottom of the back portion 103. Although FIG. 5A is a top view of the back portions 103, it could also be illustrative of a bottom view of back portions 103 since, in this implementation, the back portions 103 have a similar cross section at their upper and lower extremities. The air ducts 106 implementations illustrated in FIG. 5A are thus illustrative of the size and location of the exit ports 8 at the bottom of the back portion 103.

In all of the above implementations, as well as those described hereafter, some of the elements are not shown connected to one another in the drawings, though in reality they are coupled. They appear in exploded view in the drawings for ease of seeing the individual parts; for instance in FIG. 3A, the U joints 2 and Z joints 3 would be attached to the top plate 1 in the same configuration that they are shown; likewise in FIG. 4A the L joints 12 are coupled to the top plate 1; in FIG. 5A the U joints 2 and Z joints 3 are each coupled to the first plate 30 and the second plate 40; and in FIG. 7B the L joints 12, U joints 2, and Z joints 3 are coupled to the roof 60 of the vehicle, the bottom plate 14 of the upper portion 102, and the side walls 13 of the vehicle, according to their placement in the drawing.

Additionally, the U joints 2, Z joints 3, and/or L joints 12 of various implementations may extend along most, if not all, of the length of the upper portion 102 and back portion 103. In other implementations the U joints 2, Z joints 3, and/or L joints 12 may not extend the full length of the upper portion 102 and/or the back portion 103, but may extend to a sufficient length to support the upper portion 102 and/or back portion 103 and to divide the upper portion 102 and/or back portion 103 into air ducts 104 and 106, respectively. The length of the upper portion 102 is parallel with the direction of air flow in the upper portion 102 as indicated in FIG. 2 and the other drawings. The length of the back portion 103 is parallel with the downward direction of air flow through the back portion 103 as indicated in FIG. 2 and the other drawings. In implementations utilizing an extension 5, the U joints 2, Z joints 3, and/or L joints 12 may extend forward, from the front wall of the van body or trailer towards the front of the vehicle, in order to support the extension 5. The U joints 2, Z joints 3, and/or L joints 12 may also extend back past the rear of the van body or trailer body to support the back of the upper portion 102, the rounded portion 4, and/or the back portion 103. In some implementations the U joints 2, Z joints 3, and/or L joints 12 extend along the full length of the upper portion 102 and into the extension 5 and/or into the back portion 103 and/or rounded portion 4.

Figure 6:
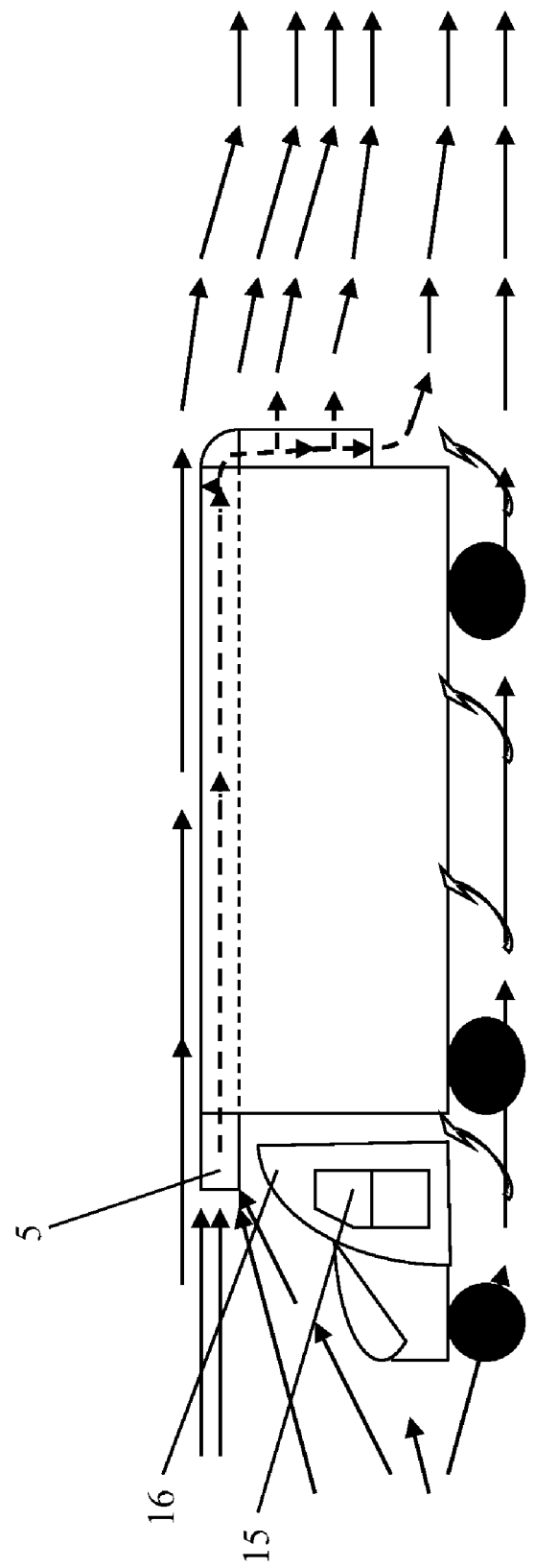
FIG. 6 is a side view of a vehicle with a vehicle drag reducer installed on top of the vehicle—with arrows indicating the movement of air, dashed arrows indicating the movement of air through the vehicle drag reducer, and the dashed line indicating where the vehicle drag reducer attaches to the top of the vehicle.

Referring now to FIG. 6, a vehicle with an installed vehicle drag reducer 100 is shown. The extension 5 can be seen extending forward over a portion of the cab 15 and air dam 16. The solid arrows indicate the air flow around the vehicle and show how the drag is generally reduced by the use of the vehicle drag reducer 100. The dashed arrows indicate the flow of air into the extension 5, through the air ducts 104 in the upper portion 102, past the rounded portion 4 and down into the back portion 103, and then out through the exit ports 6 and 7 on the back of the back portion 103 and out through the exit port 8 on the bottom of the back portion 103. The dashed line below the upper portion 102 indicates where the upper portion 102 was installed on top of the roof 60 of the vehicle trailer. This, then, is an implementation wherein the vehicle drag reducer 100 is installed on the top of a vehicle or trailer.

Referring now to FIG. 7A, in an alternative implementation of a vehicle drag reducer 100 the upper portion 102 is actually installed inside the top of a vehicle or trailer. This implementation is shown in FIG. 7A, where the dashed line indicates where a bottom plate 14 is installed inside the trailer. Referring to FIG. 7B, which is a front cross section of the vehicle trailer in FIG. 7A across the line B-B, the roof 60 and the side walls 13 act as the upper and side portions of the upper portion 102, while U joints 2, Z joints 3, and L joints 12 run the length of the trailer and hold the bottom plate 14 in place and provide the structure for the upper portion 102. The roof 60, U joints 2, Z joints 3, L joints 12, and bottom plate 14 also form the four air ducts 104.

In this implementation, at least one opening is cut in a front wall of the vehicle to facilitate the air passing into the vehicle, and openings are cut in the rear doors of the vehicle to facilitate the air passing out of the vehicle. In this implementation the air flows from outside the vehicle through the extension 5 (which can be seen extending forward over a portion of the cab 15 and air dam 16), past the at least one opening cut in the front wall of the vehicle, through the upper portion 102 by way of the air ducts 104, through the openings in the rear doors, past the rounded portion 4 and downward where it then exits the back portion 103 through the exit ports 108. FIG. 7C is a front view of an L joint 12. The upper portion 102 may extend backward from the inside of the vehicle out through the openings in the rear doors, and/or the rounded portion 4 may extend inwardly into the openings in the rear doors from outside the vehicle, and/or the back portion 103 may extend inwardly into the openings in the rear doors from outside the vehicle.

While any material may be used for the various elements of a vehicle drag reducer 100, in some implementations the vehicle drag reducer 100 is constructed partially or completely of aluminum sheeting. In some implementations the vehicle drag reducer 100 is installed partially or completely with self tapping screws. In some implementations the U joints 2, Z joints 3, and/or L joints 12 are formed from ten inch pieces of aluminum sheeting.

In some implementations there are two back portions 103 and each back portion 103 is located at a rear door of the vehicle—one corresponding with each rear door. In some implementations the back portions 103 only extend downward as far as the rear door latch handles. In some implementations the existing hinges on the rear doors of the vehicle may be replaced with double-hinged hinges to allow proper opening of the doors with the system attached to the doors. For van bodies or trailers or vehicles with overhead doors, the back portion 103 may include a second plate 40 and the back portion 103 may be attached to the van body, vehicle body or trailer body using hinges (or double-hinged hinges) to allow the back portion 103 to swing away for access to the overhead door.

In places where the description above refers to particular implementations of vehicle drag reducers, it should be readily apparent that a number of modifications may be made without departing from the spirit thereof and that these implementations may be applied to other vehicle drag reducers.

The invention claimed is:

1. A vehicle drag reducer, comprising:
    an upper portion that is one of attached to and integrated within a top of a vehicle, the upper portion comprising four air ducts configured to receive air from a front end of the top of the vehicle and transmit the air c yards a rear end of the top of the vehicle; and
    two back portions coupled to the upper portion and located at a back of the vehicle each comprising two air ducts and six exit ports, each back portion being configured to receive air from two of the four air ducts of the upper portion and exit the air from the back portion through the six exit ports;
    wherein the upper portion further comprises an extension extending forward towards a front of the vehicle over a portion of one of a cab and an air dam of the vehicle across an entire width of the vehicle.

2. The vehicle drag reducer of claim 1, wherein the upper portion further comprises one of a U joint, a Z joint, and an L joint connecting the upper portion with the vehicle and at least partially forming an air duct.

3. The vehicle drag reducer of claim 1, wherein the back portion further comprises one of a U joint and a Z joint at least partially forming an air duct and connecting a first back plate of the back portion to one of a second plate of the back portion and a rear door of the vehicle.

4. The vehicle drag reducer of claim 1, further comprising a rounded portion at a juncture of the upper portion and the back portion, configured to direct the air from the upper portion towards the back portion.

5. The vehicle drag reducer of claim 1, wherein the upper portion further comprises three Z joints and two U joints connecting the upper portion with the vehicle and extending substantially the length of the vehicle at least partially forming an air duct and the back portion further comprises four U joints and two Z joints at least partially forming an air duct connecting a first plate of the back portion to one of a second plate of the back portion and a rear door of the vehicle.

6. A vehicle drag reducer, comprising:
    an upper portion that is one of attached to and integrated within a top of a vehicle, the upper portion comprising one of a U joint, a Z joint, and an L joint connecting the upper portion to the vehicle and extending substantially the length of the vehicle at least partially forming an air duct; the upper portion being configured to receive air from a front of the top of the vehicle and transmit the air towards a rear end of the top of the vehicle; and
    a back portion located at a back of the vehicle comprising an exit port and comprising one of a U joint and a Z joint at least partially forming an air duct, the back portion being coupled to the upper portion and configured to receive air from the upper portion and exit the air from the back portion through the exit port;
    wherein the upper portion further comprises an extension extending forward towards a front of the vehicle over a portion of one of a cab and an air dam of the vehicle across an entire width of the vehicle.

7. The vehicle drag reducer of claim 6, wherein the upper portion further comprises four air ducts configured to receive air from a front end of the top of the vehicle and transmit the air towards a rear end of the top of the vehicle.

8. The vehicle drag reducer of claim 6, wherein the back portion further comprises two air ducts.

9. The vehicle drag reducer of claim 6, wherein the back portion further comprises six exit ports.

10. The vehicle drag reducer of claim 6, wherein the vehicle drag reducer comprises two back portions and each back portion comprises two air ducts and is configured to receive air from two of four air ducts of the upper portion and exit the air from the back portion through six exit ports of the back portion.

11. The vehicle drag reducer of claim 6, further comprising a rounded portion at a juncture of the upper portion and the back portion, configured to direct the air from the upper portion towards the back portion.

12. The vehicle drag reducer of claim 6, wherein the upper portion further comprises three Z joints and two U joints connecting the upper portion to the vehicle, and the back portion further comprises four U joints and two Z joints connecting the first plate of the back portion to one of a second plate of the back portion and a rear door of the vehicle.

13. A method of reducing vehicle drag, comprising:
    one of attaching an upper portion of a vehicle drag reducer to a top of a vehicle and integrating an upper portion of a vehicle drag reducer within a top of a vehicle, the upper portion comprising four air ducts configured to receive air from a from end of the top of the vehicle and transmit the air towards a rear end of the top of the vehicle;
    locating two back portions of the vehicle drag reducer at a back of the vehicle and coupled to the upper portion, the back portions each comprising two air ducts and six exit ports, each back portion being configured to receive air from two of the four air ducts of the upper portion and exit the air from the back portion through the six exit ports; and directing the air from the upper portion towards the back portion through a rounded portion at a juncture of the upper portion and the back portion.

14. The method of claim 13, further comprising coupling the upper portion to the vehicle with one of an L joint, a Z joint, and a U joint extending substantially length of the vehicle and at least partially forming an air duct.

15. The method of claim 13, further comprising coupling a first plate of the back portion to one of a second plate of the back portion and a rear door of the vehicle with one of an L joint, a Z joint, and Z joint, the one of the joint, Z joint and U joint at least partially forming an air duct.

16. The method of claim 13, further comprising extending an extension of the upper portion forward towards a front of the vehicle over a portion of one of a cab and an air dam of the vehicle across an entire width of the vehicle.

17. The method of claim 13, further comprising coupling the upper portion to the vehicle with three Z joints and two U joints, the three Z joints and two U joints at least partially forming an air duct and connecting a first plate of the back portion to one of a second plate of the back portion and a rear door of the vehicle with four U joints and two Z joints, the four U joints and two Z joints at least partially forming an air duct.

* * * * *

UNITED STATES PATENT AND TRADEMARK OFFICE
CERTIFICATE OF CORRECTION

PATENT NO. : 8,196,996 B1
APPLICATION NO. : 12/938989
DATED : June 12, 2012
INVENTOR(S) : Robert Campbell It is certified that error appears in the above-identified patent and that said Letters Patent is hereby corrected as shown below:

Claim 1, Column 7, line 43, cancel the text "c yards" and insert --towards--.

Claim 15, Column 9, line 11, cancel the text "a Z joint, and Z joint, the one of the joint, Z joint and U joint at least partially forming an air duct" and insert --a Z joint, and a U joint, the one of the L joint, Z joint and U joint at least partially forming an air duct--.

Signed and Sealed this
Second Day of October, 2012

David J. Kappos
*Director of the United States Patent and Trademark Office*